Figure 1:
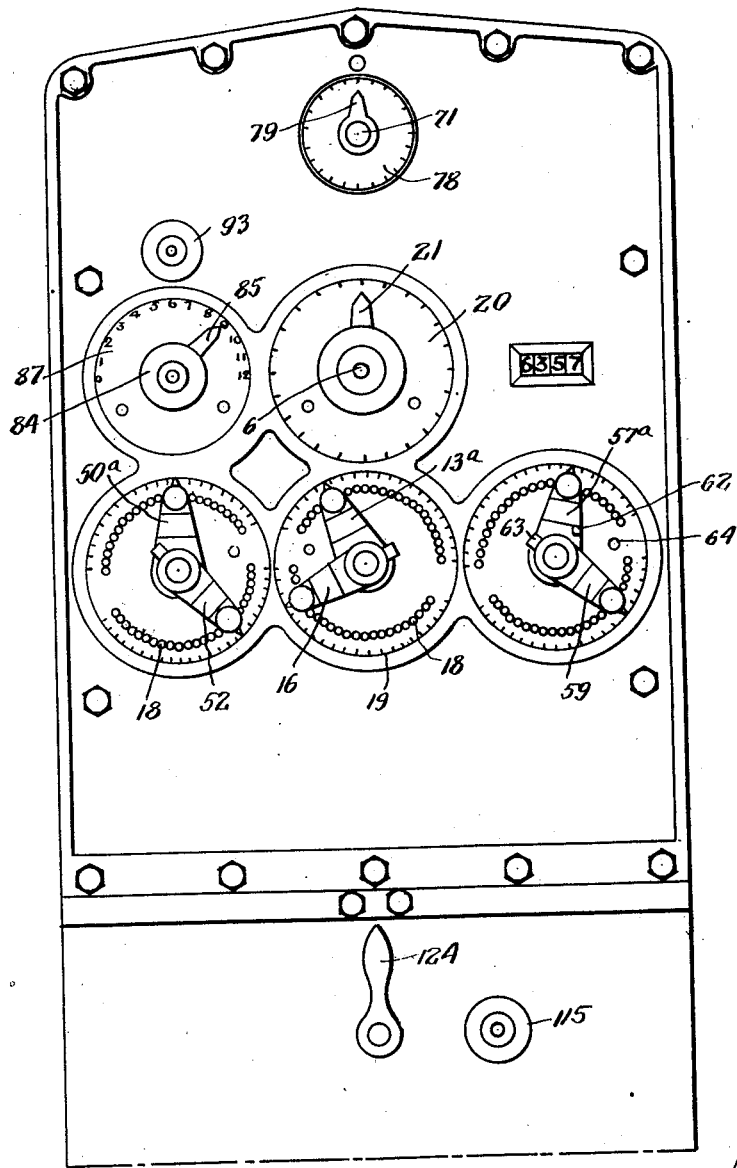

July 5, 1927. 1,634,327
J. S. KENNEDY
AUTOMATIC SEQUENCE CONTROL FOR VALVES
Filed Aug. 15, 1924 15 Sheets-Sheet 1

James S. Kennedy
Inventor

By his Attorney

July 5, 1927. 1,634,327
J. S. KENNEDY
AUTOMATIC SEQUENCE CONTROL FOR VALVES
Filed Aug. 15, 1924   15 Sheets-Sheet 2

Inventor
James S. Kennedy
By his Attorney

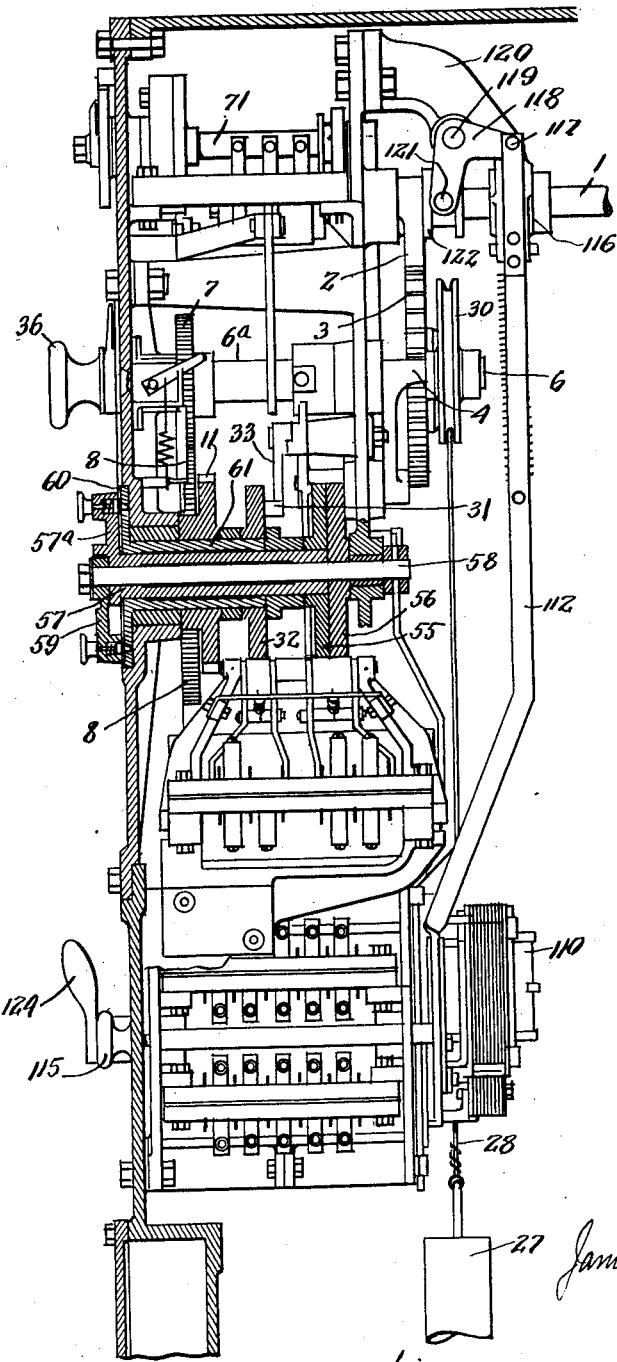

July 5, 1927. 1,634,327
J. S. KENNEDY
AUTOMATIC SEQUENCE CONTROL FOR VALVES
Filed Aug. 15, 1924 15 Sheets-Sheet 4
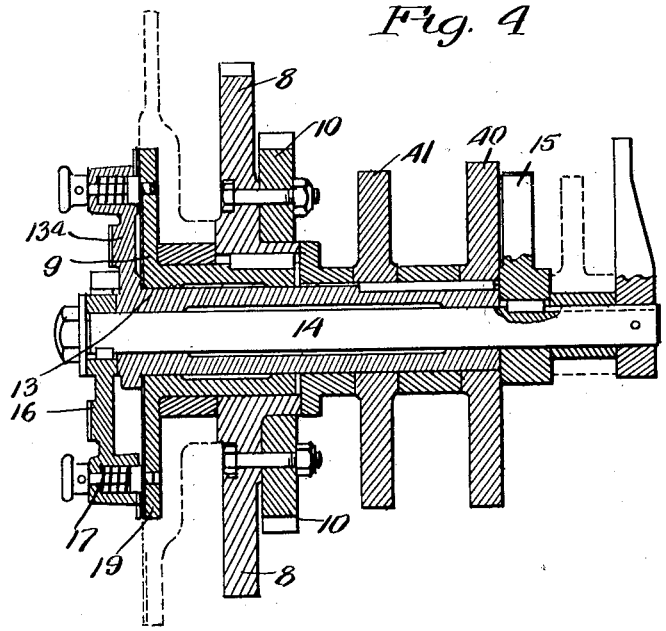
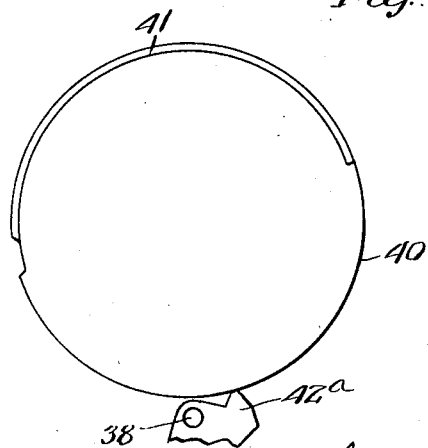

July 5, 1927.  
J. S. KENNEDY  
1,634,327  
AUTOMATIC SEQUENCE CONTROL FOR VALVES  
Filed Aug. 15, 1924  15 Sheets-Sheet 5

James S. Kennedy  
Inventor  
By his Attorney

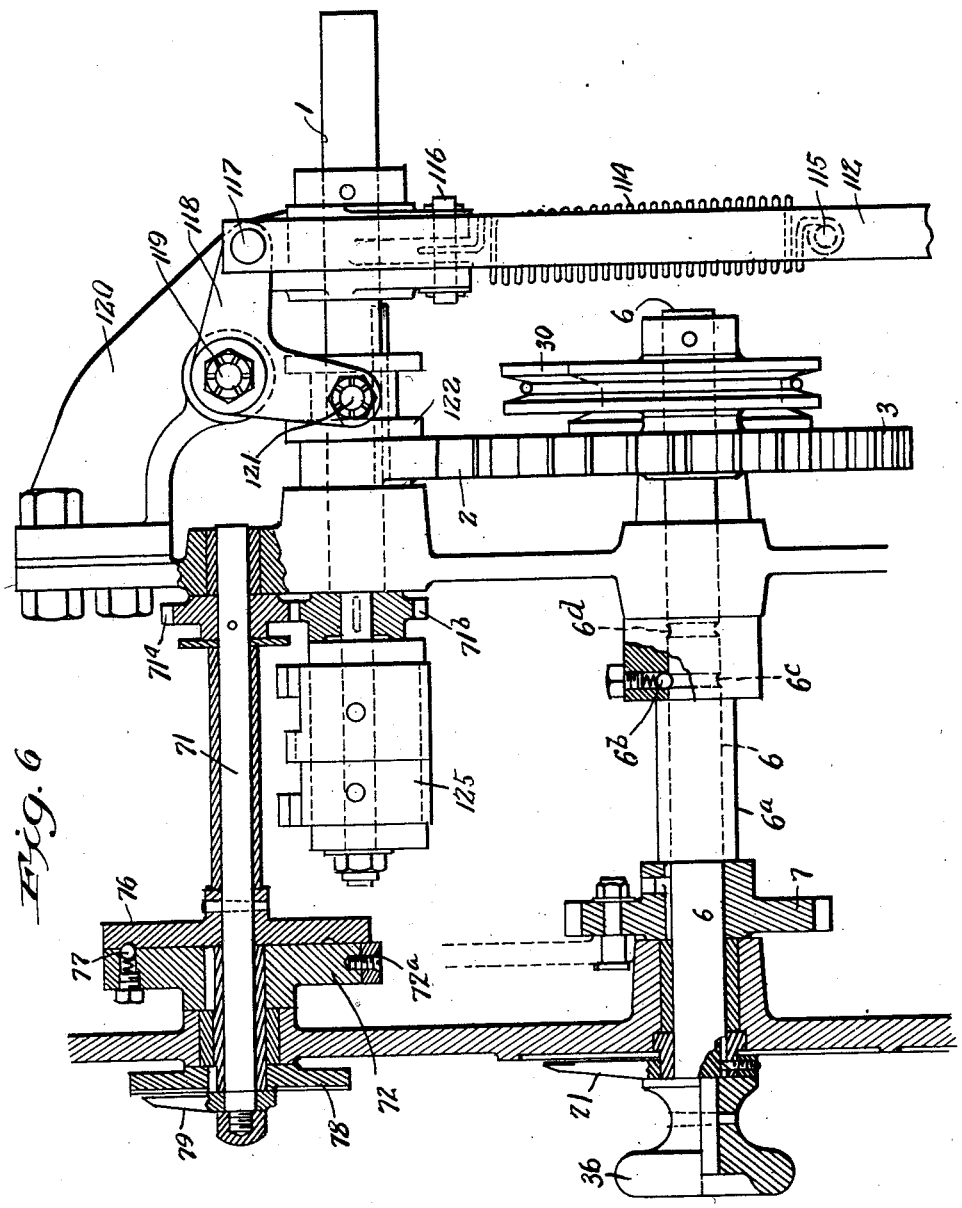

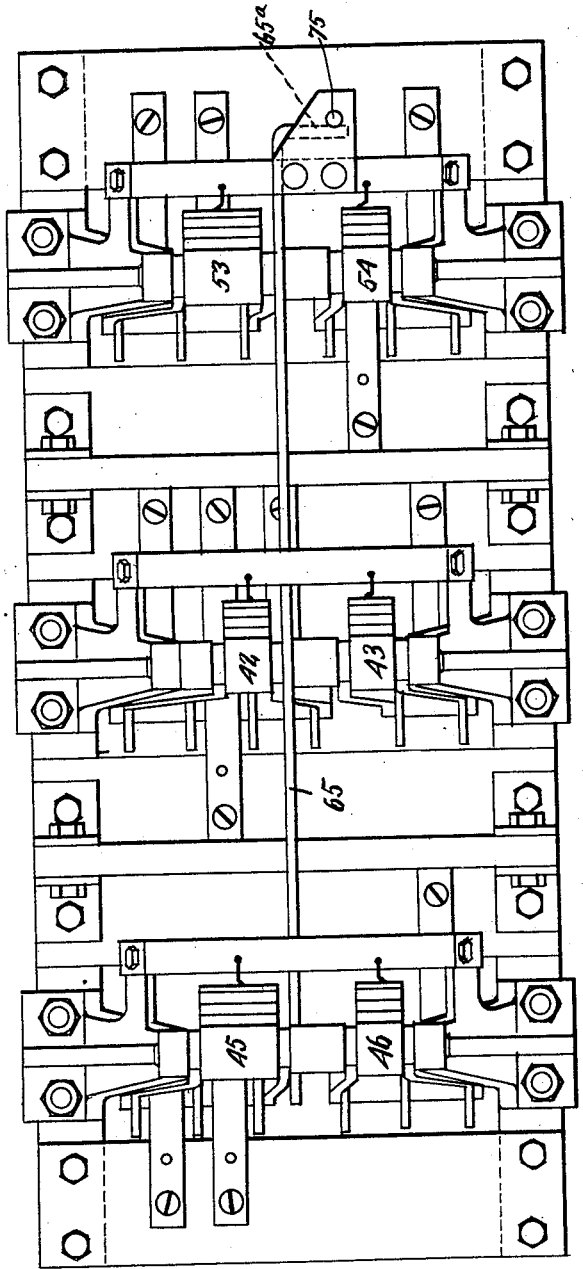

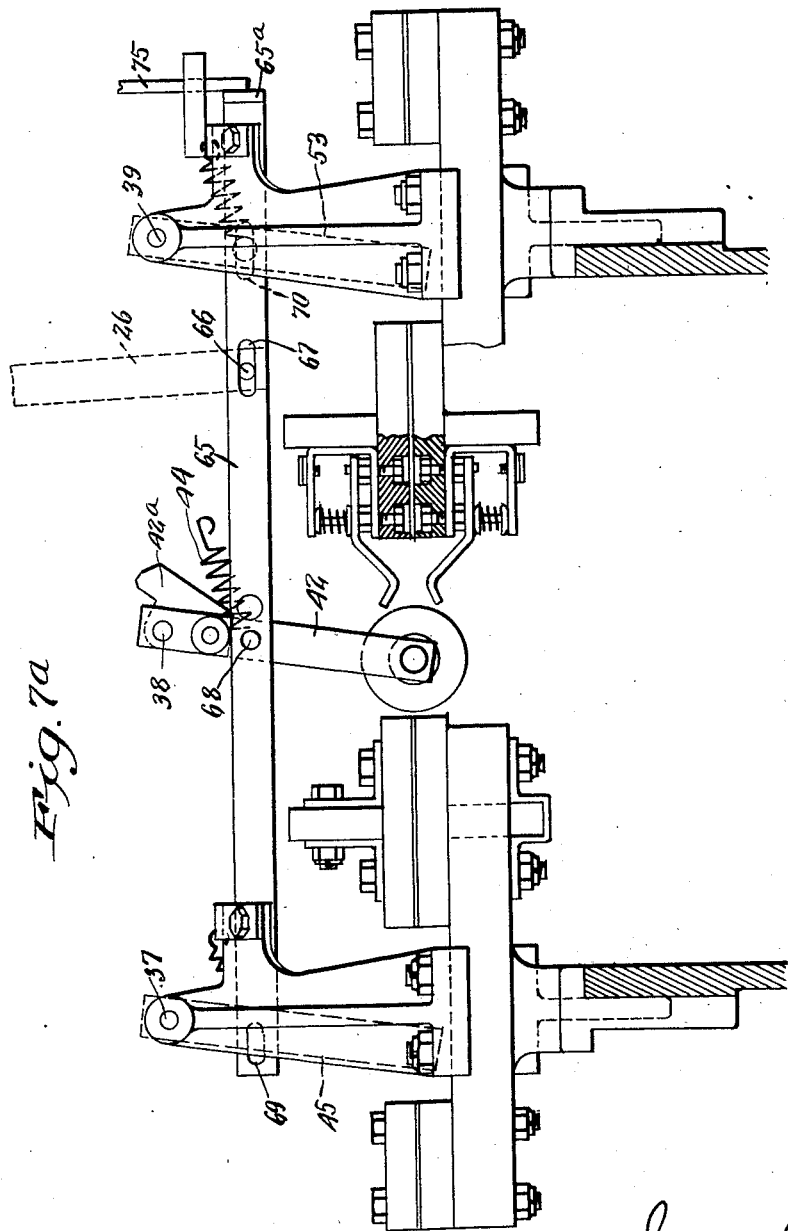

July 5, 1927.

J. S. KENNEDY 1,634,327

AUTOMATIC SEQUENCE CONTROL FOR VALVES

Filed Aug. 15, 1924   15 Sheets-Sheet 9

James S. Kennedy
Inventor

By his Attorney

July 5, 1927.   1,634,327
J. S. KENNEDY
AUTOMATIC SEQUENCE CONTROL FOR VALVES
Filed Aug. 15, 1924   15 Sheets-Sheet 10

James S. Kennedy
Inventor

By his Attorney

July 5, 1927.
J. S. KENNEDY
1,634,327
AUTOMATIC SEQUENCE CONTROL FOR VALVES
Filed Aug. 15, 1924     15 Sheets-Sheet 11
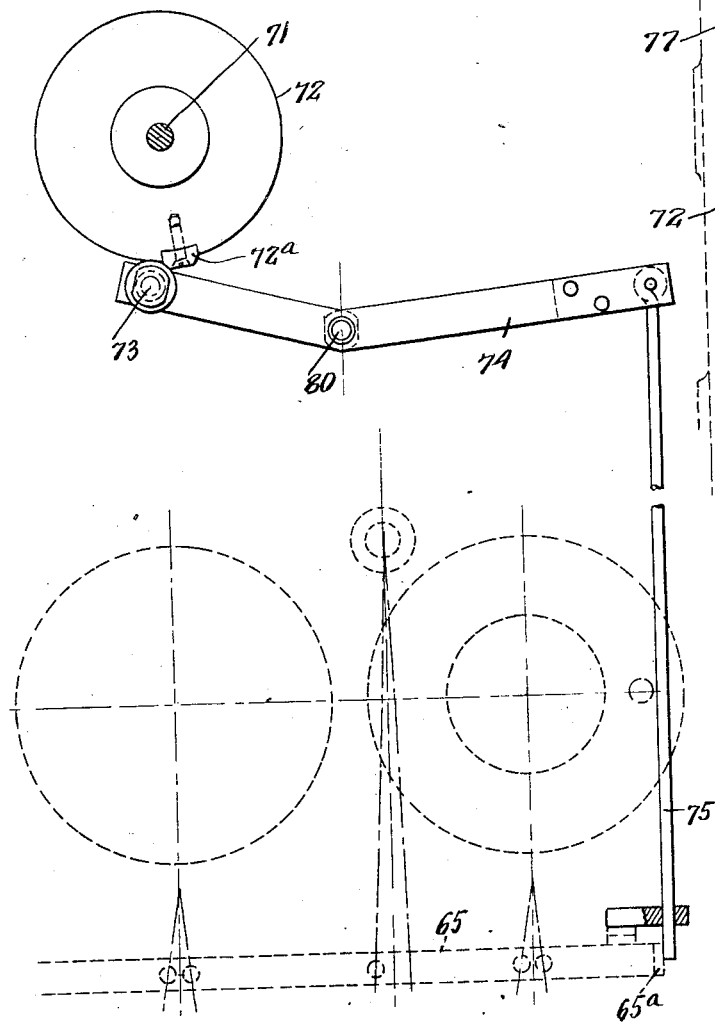
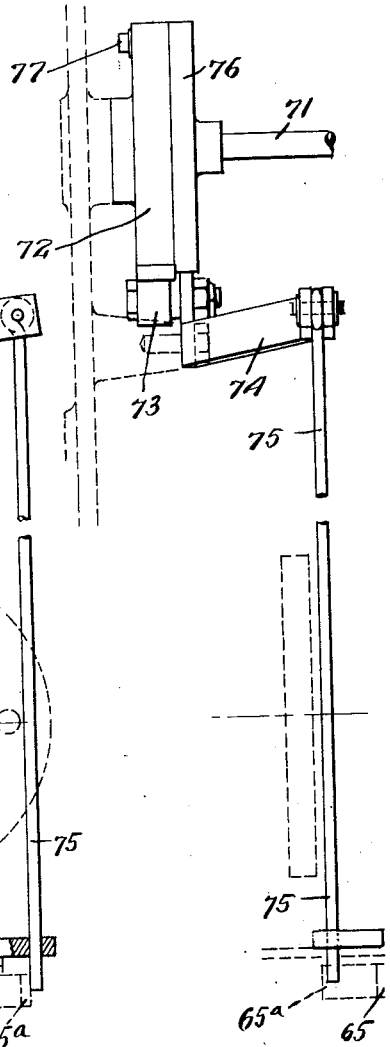

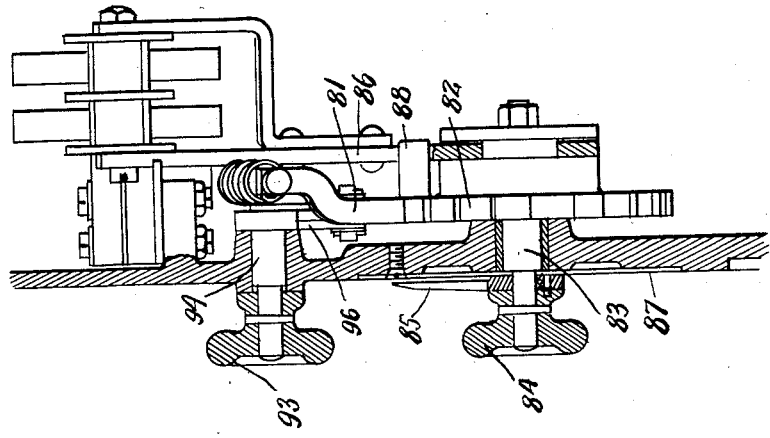
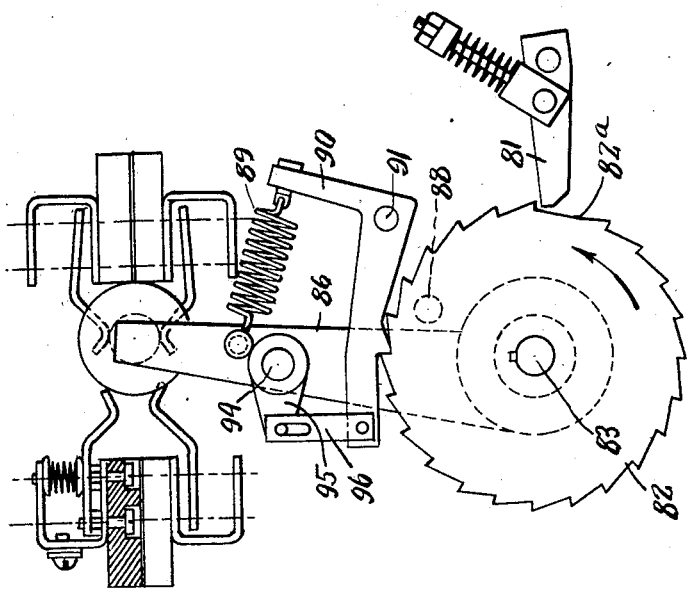

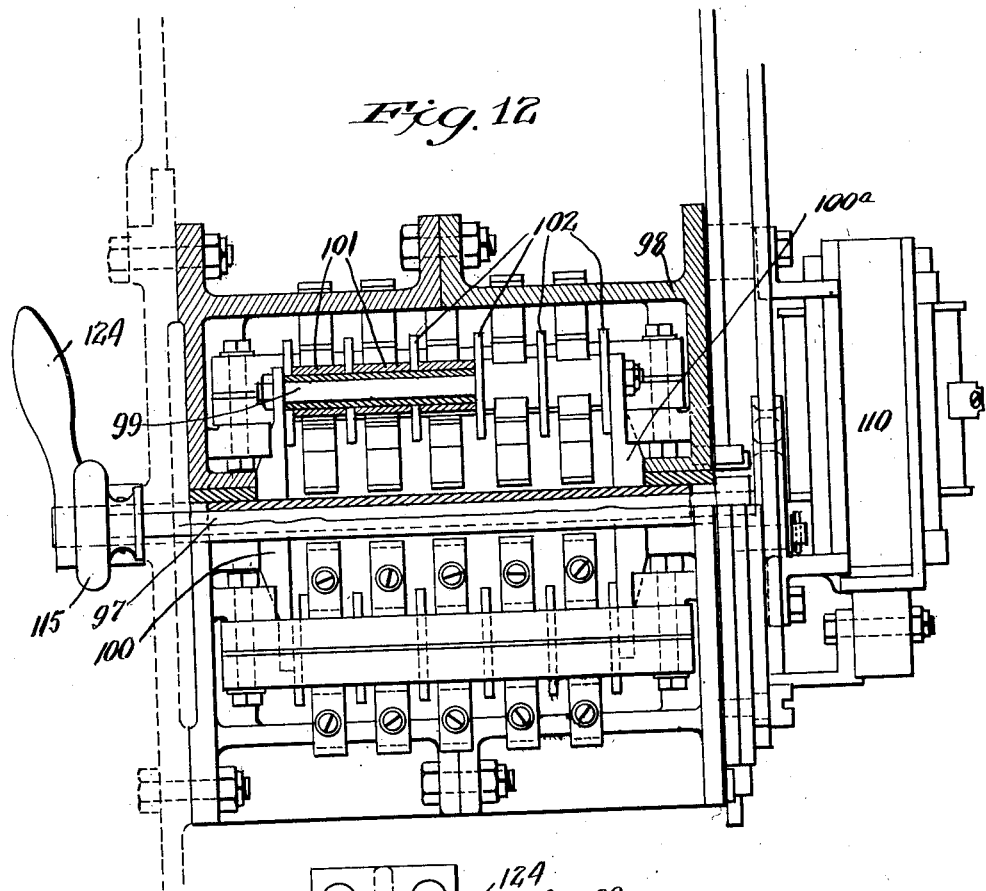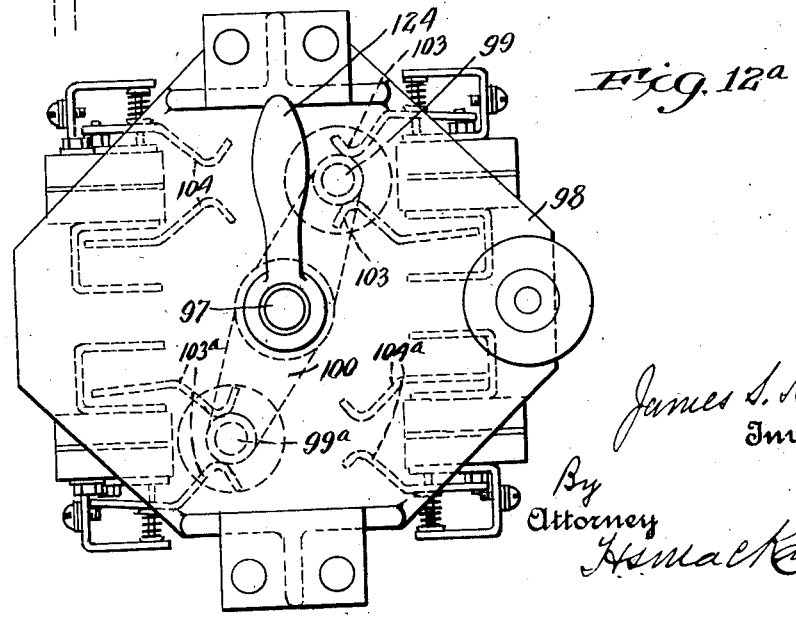

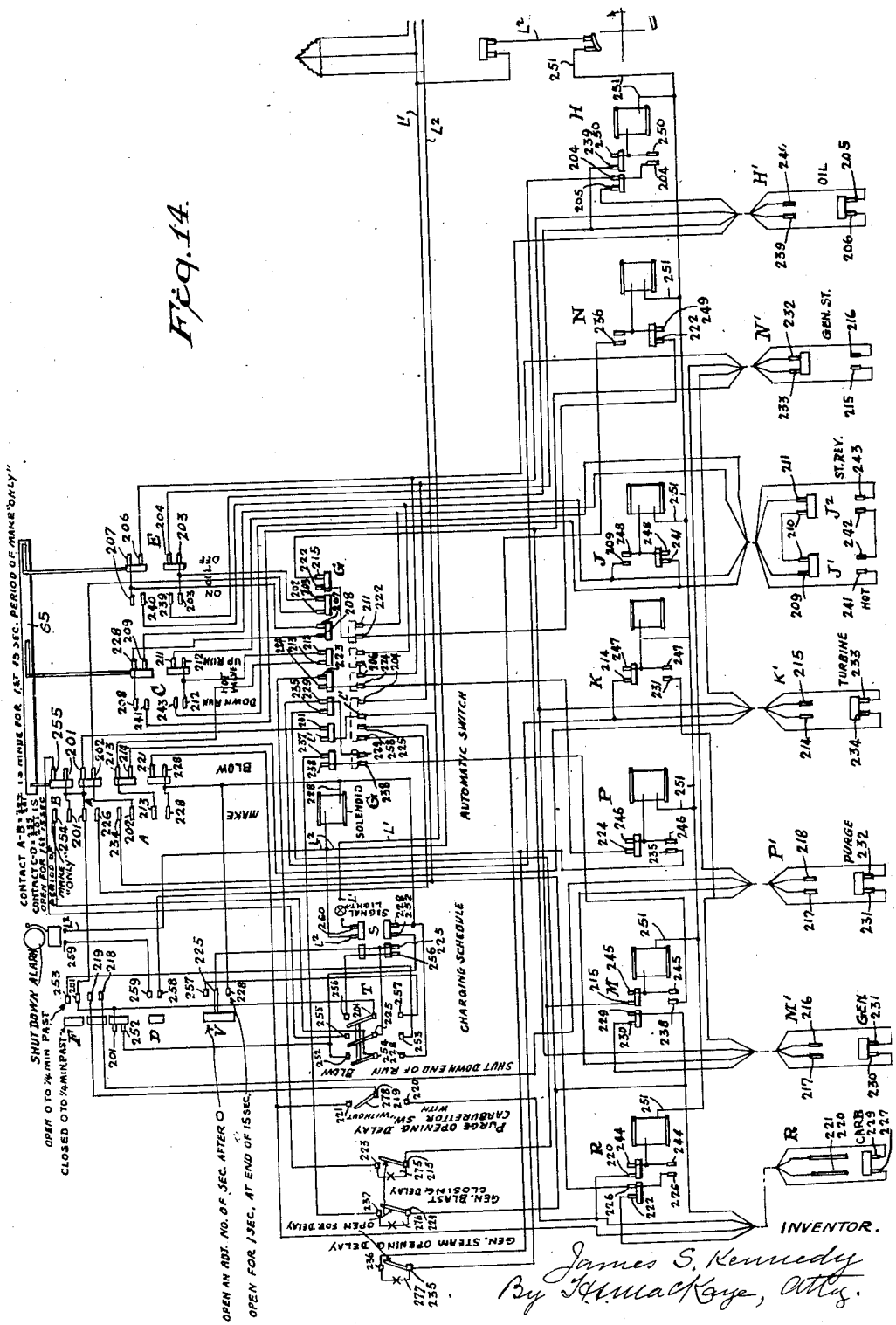

Patented July 5, 1927.

1,634,327

UNITED STATES PATENT OFFICE.

JAMES S. KENNEDY, OF PELHAM MANOR, NEW YORK, ASSIGNOR TO THE BARTLETT HAYWARD COMPANY, A CORPORATION OF MARYLAND.

AUTOMATIC SEQUENCE CONTROL FOR VALVES.

Application filed August 15, 1924. Serial No. 732,189.

The present invention has relation broadly to a basically novel system of electrical control and operation of valves in a predetermined sequence, where these are used for governing the operation of devices of various kinds; as for instance for determining the proper successive operation of the instrumentalities which are employed in the manufacture of gas. The invention includes certain improved apparatus for automatic timing and control of the circuit changes incidental to operation of electrical systems in this connection.

While the invention is not limited to any specific use, it has been found particularly valuable and effective in the operation of gas making plants, and especially in water gas sets. The invention will therefore be described herein with relation to that particular use, by way of example, without waiving any broader application of the invention as coming within the claims.

The following are some of the principal advantages of the invention.

The system operates on a normally closed electric circuit, so that failure of current causes automatic shut down. The construction is such that within fifteen seconds after failure due to broken wire or loose connection the system is prepared for automatically shutting down in safe condition on restoration of current, instead of waiting until the wire fails when called upon to carry current.

The entire apparatus is checked up every fifteen seconds before and after valve operation is due and automatic shut down in safe position results where such "checking up" discloses a failure of operation.

In cases of accidental grounding of the electric system, the entire apparatus is automatically shut down in safe position.

The apparatus can be taken over to hand control on any cycle at any time with full protection by interlocking switches and by safety shut down.

The relation between "blow" and "run" in a water gas set can be varied to practically any proportional times, instead of being limited to multiples of quarter minutes.

The apparatus automatically shuts down to safety when re-coaling is required, and this occurs either after a "blow" or after a "run" as desired. When so operated after a "run" the set is automatically "purged" before shut down.

Whenever a shut down occurs due to failure of a valve in any sequence, location of the offending valve is easily and quickly accomplished.

The apparatus is capable of going right on with a cycle after a shut down, instead of having to return to zero first.

Figure 2:
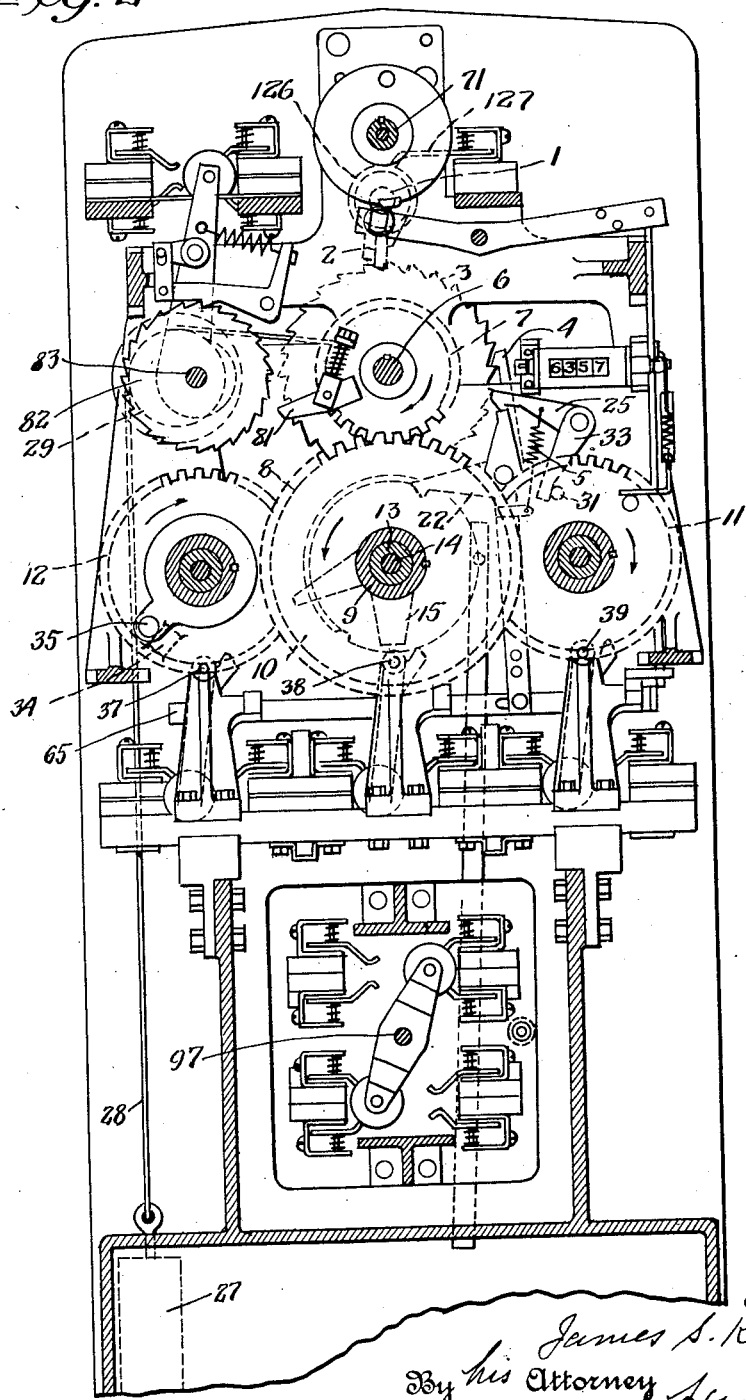
Figure 5:
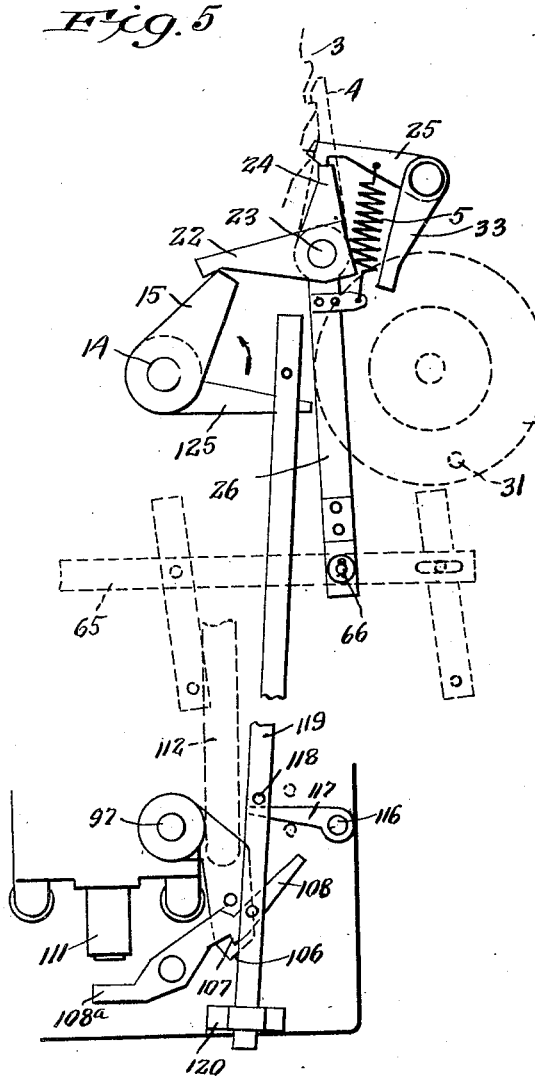
Figure 5A:
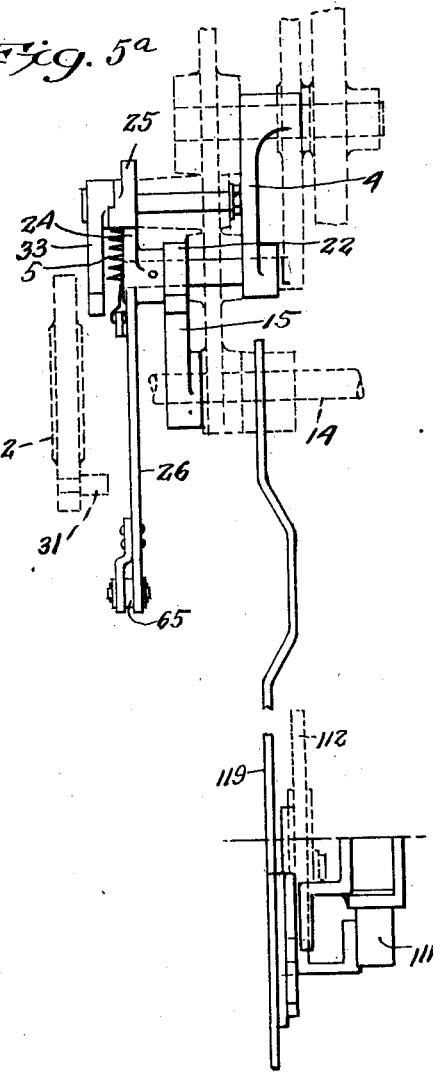
Figure 7B:
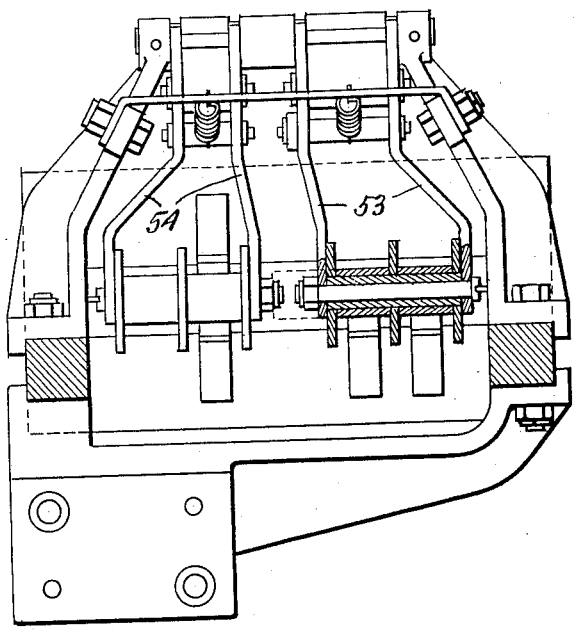
Figure 8B:
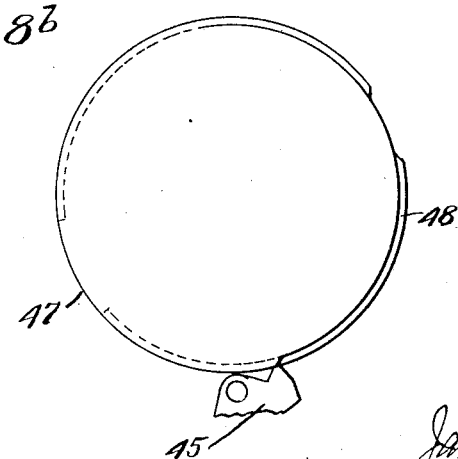
Figure 8:
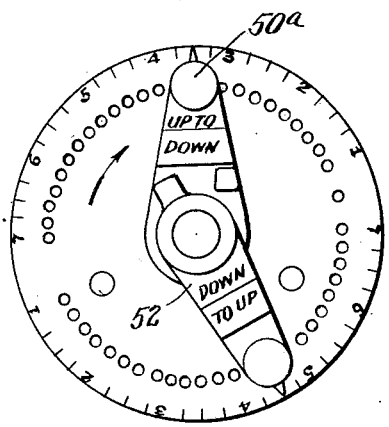
Figure 8A:
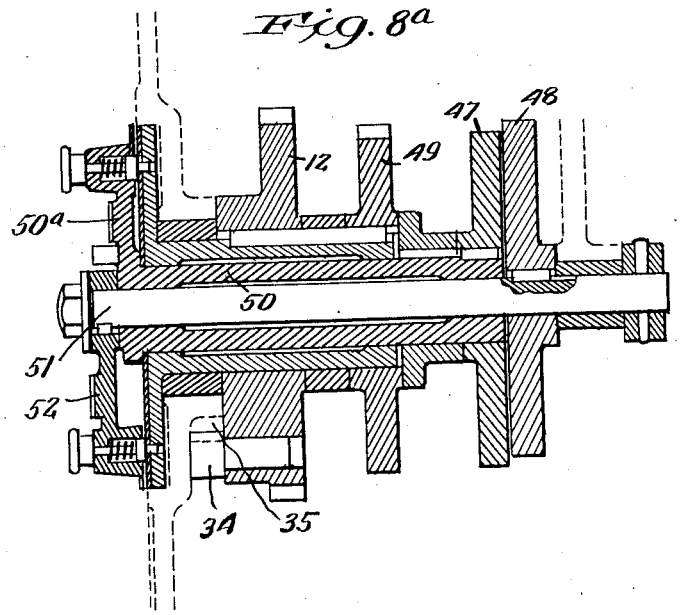
Figure 13:
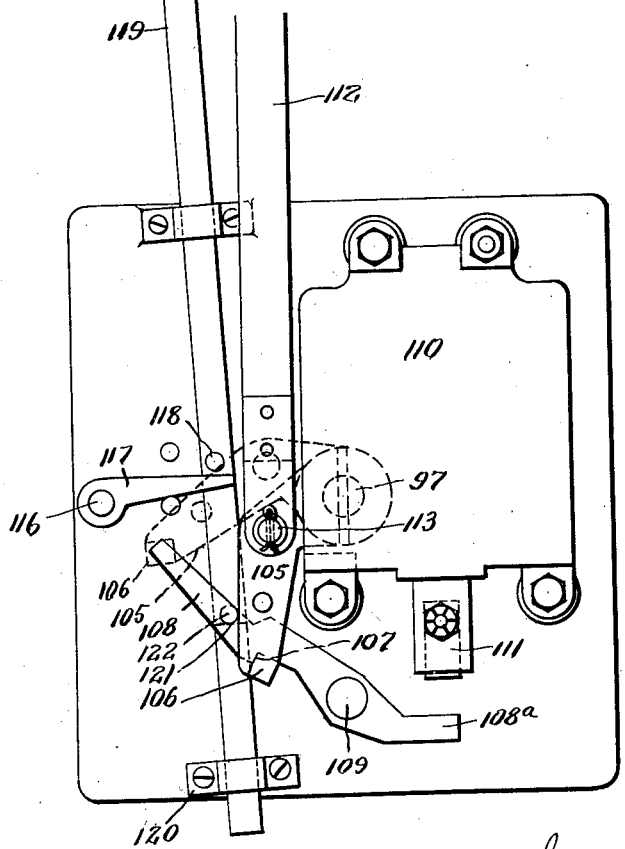

The invention is illustrated in a preferred form in the accompanying drawings wherein Figure 1 is a front elevation of the central controller apparatus, Figure 2 is a view of the same in front elevation with the front of the casing removed, Figure 3 is a side elevation of the same with the side of the casing removed, certain portions being shown in vertical section, Figure 4 is a vertical sectional view of certain switch-operating cams, Figure 4ª is a face view of said cams showing their relation to one switch arm operated by them, Figure 5 is a front elevation of certain parts of the "return to zero" and safety shut down mechanism, Figure 5ª is a side elevation of the same, Figure 6 is a view partly in section and partly in side elevation showing the hand operating means and associated parts, Figure 7 is a plan view of the switches operated by the three sets of cams, Figure 7ª is a view in elevation of the mechanical interlock bar and associated parts, Figure 7ᵇ is an end view partly in section of the switch group shown in Figure 7, Figure 8 is a front view of one of the setting dials and arms, Figure 8ª shows the same in vertical section together with the gears and cams associated with it, Figure 8ᵇ is a view similar to Figure 4ª but showing the twin cams of Figure 8, Figure 9 is a diagrammatic front view of the "time adjusting" device, Figure 10 is a side view of the same, Figure 11 is a front view of the "charging schedule" switch seen with the front of the casing removed, Figure 11ª is a side view of the same with the casing front and parts in front thereof shown in vertical section, Figure 12 is a side view partly in elevation of the automatic shut down switch, Figure 12ª is a front view of the same, Figure 13 is a rear view of the same and of certain operating parts therefor, and Figure 14 is a diagram of the electric circuits employed in my system.

The system of electrical circuits and switches employed by me will be described in connection with the diagram which accompanies this specification; but it will be best to describe first the preferred apparatus whereby these circuits are automatically controlled from a single central point.

Referring to Figures 2 and 3, the principal or master shaft 1 is rotated continuously anti-clockwise by any convenient motive means, making one complete revolution (preferably) in fifteen seconds. This shaft carries a driving pawl 2 which drives a toothed wheel 3 by engaging and moving forward one tooth after the other on said wheel. The ratchet wheel 3 is preferably furnished with 28 teeth, and, as the pawl 2 moves the wheel 3 the distance of one tooth every quarter minute, said wheel evidently makes a complete revolution in seven minutes.

Apparatus hereinafter described tends constantly to rotate the wheel 3 backward, and this tendency is normally counteracted by the click-pawl 4 which is held against the ratchet wheel 3 by a spring 5 (see Figures 5 and 5ª).

The wheel 3 acts to rotate the shaft 6, to which it is keyed, in a clockwise direction. A slidably keyed sleeve 6ª is on the shaft 6, and the gear wheel 7 is fastened on said sleeve (see Fig. 6). The shaft 6 acts through the sleeve 6ª to rotate the gear 7 clockwise, and this gear engages and drives the gear 8 keyed on a sleeve 9 (see Figs. 2, 4 and 6). The gear 10 is attached to the gear 8, and engages and drives both gears 11 and 12 to right and left respectively.

The gear 8 has twice as many teeth as gear 7 and therefore is rotated only 1/56th of a revolution every quarter minute. Gears 10, 11 and 12 are all of the same size and therefore they are all driven step-by-step 1/56th of a revolution every quarter minute.

Rotating independently within the sleeve 9 (see Fig. 4) are the sleeve 13 and the shaft 14; and the "end of run" arm 15 is fixed to the rear end of the shaft 14 (see Figures 4 and 5). The arrows in Figure 2 indicate the direction in which the various shafts are turned.

The angular relation of the shaft 14 to the gear 8 and sleeve 9 can be adjusted to positions 1/56th of a revolution apart by means of an indicating and setting arm 16, on the front end of the shaft 14, which arm carries a spring pin 17 adapted to enter any one of the circular row of holes 18 in the graduated disc 19 attached to the sleeve 9.

Attached to the front frame plate (Fig. 1) is a dial plate 20, concentric with the shaft 6. The dial 20 has 28 quarter minute graduations around its periphery, and, as the shaft 6 is driven forward step-by-step the pointer 21 indicates these graduations successively.

As shown in the drawings, the setting arm 16 is secured in the "six minute" hole in the plate 19, and the "end of run" arm 15 is keyed to shaft 14 in such an angular position that when the pointer 21 indicates the six minute division on the dial 20 the arm 15 pushes the arm 22 keyed on the shaft 23, to which shaft are also attached the holding pawl 4 and locking arm 24. This obviously withdraws the pawl 4, freeing the wheel 3, and the parts are locked in this position by the end of the lever 24 coming under the latch 25. This latch is held down by the spring 5 which also holds the pawl 4 against the wheel 3, being attached at one end to the latch 25 and at the other end to a projection on the long lever 26 attached to the shaft 23 (see Figures 5 and 5ª).

The action of the arm 15 just described always occurs at a moment when the driving pawl 2 is driving one of the teeth of the wheel 3.

As soon as the driving pawl 2 passes on, however, the pawl 4 having been withdrawn, the wheel 3 is free to rotate backward under the influence of a weight 27 (see Figures 3 and 6) carried on a cord 28 which passes over sheaves 29 and 30, the latter being fixed on the shaft 6. The end of the cord 28 is fastened to the periphery of the sheave 30.

The weight 27 thus acts to produce a quick counter-clockwise movement of the wheel 3, with a corresponding backward movement of wheels 7, 8, 10, 11 and 12. This continues until a stop pin 31 (Fig. 5) on the cam 32, attached to the gear 11, strikes the arm 33 which is a bell-crank extension of the latch 25 (see Figs. 3 and 5). This lifts said latch, releases the arm 24, and allows the retaining pawl 4 to engage a tooth on the wheel 3, thereby stopping the same in zero position. This is the position indicated by the pointer 21 in Figure 1.

In order always to insure a definite stop at zero, a fixed stop 34 is provided (see Fig. 2) which is attached to the main frame. A stop arm 35 attached to the gear 12 rests against this stop 34 when all parts are in zero position.

This automatic return to zero occurs at the end of a cycle of operation, the duration of which is determined by the setting of the arm 16. Of course, since the master shaft 1 is moving continuously, the driving pawl 2 will again begin to drive the wheel 3 forward the next time the shaft 1 completes a revolution. This is a quarter minute after the moment of release of the pawl 4, above described.

It is one of the advantages of my apparatus that the cycle may be operated by hand at any time desired; when, of course, the entire gas making organization ceases to be entirely automatic for the time being.

This is accomplished by pulling the shaft 6 forward within the sleeve 6ª, by means of the knob 36 outside and in front (see Fig. 6). This draws the ratchet wheel 3 out of the plane of rotation of the driving pawl 2. The pawl 4 remains effective on account of its broad engaging tooth (see Figures 3 and 5ª). The gear 7, and those moved by it, are not disturbed, since 7 is mounted on the sleeve 6ª, slidably keyed on the shaft 6. In order to provide a frictional retaining means for the two positions of the shaft 6, I prefer to provide a spring-pressed ball 6ᵇ which enters either groove 6ᶜ or 6ᵈ in shaft 6 according to whether automatic or hand operation is desired. Of course, when the shaft 6 has been thus drawn forward, the gear train is then operated by turning the knob 36 by hand.

The three gears 10, 11 and 12 respectively operate three sets of switches the functions of which will appear in connection with the explanation of the electrical diagram. These switches are moved by switch arms mounted respectively on the three shafts 37, 38 and 39 (see Figure 2).

I shall describe the operation of the switch arms on the shaft 38 by way of illustration; it being understood that the switch arms on shafts 37 and 39 are operated in a similar manner.

Referring to Figure 4 it will be seen that the sleeve 9 causes the sleeve 13 to rotate by means of the adjustable setting arm 13ª integral with 13. This arm is driven through the disc 19 in the same manner as the arm 16.

The cams 40 and 41 are keyed to the sleeve 13 in a definite relative position.

Two switch arms 42 and 43 (Figs. 4ª and 7) are loosely mounted on the shaft 38. Their construction in elevation is like that shown in Figure 7ᵇ which illustrates switch arms 53 and 54. These switch arms 42 and 43 bear at their upper ends 42ª respectively against the cams 40 and 41 being pressed by a spring 44 attached to lever 42 and a similar spring attached to lever 43 so that the cam 40 operates the lever 42, and the cam 41 operates the lever 43. Hence as shown in Figure 7ª, when either arm bears on the raised portion of its cam, switch contact is made with the contact arms on the left side in Figures 7 and 7ª. When either arm 42 or 43 bears against a "valley" in its cam, contact is made with the arms on the right side in Figures 7 and 7ª. (Figure 7ª shows the movable switch member half way between contacts.)

For convenient reference to the diagram hereinafter described, the switch operated by the cam 40 and arm 42 will be referred to as "switch A" and that operated by cam 41 and arm 43 will be called "switch B."

The time of operation of these switches is determined by the position of the setting arm 13ª, and thereby is determined the time when the "run" begins in a water gas set.

The switches which control operation of the "hot valve" and the auxiliary circuits for the "begin blow" sequence are operated through the gear 12. The details of the construction whereby this is accomplished are shown in Figures 8 and 8ª taken in conjunction with the description just given of the operation of switches A and B.

Switch arm 45 is operated, in the manner heretofore described, by the cams 47 and 48, acting as a compound cam in a well known manner. That is to say, the upper end of the switch arm 45 extends across the peripheries of both twin cams 47, 48 and its lower end therefore swings to the right under the influence of its spring only when the upper end is opposite the "valley" portion of both twin cams. (This will be clear from Figure 8ᵇ.) The switch operated by this arm 45 will be referred to as "switch C".

The angular position of the cam 47, keyed on the sleeve 50, is arranged by means of the setting arm 50ª fixed to said sleeve, in the manner described with relation to Figure 4. The cam 48 is similarly adjusted by the arm 52 fixed on the shaft 51 to which the cam 48 is keyed.

The switch arm 46 in Figure 7 is operated by the single non-adjustable cam 49 which is fastened directly to the gear 12 (see Fig. 8ª). This switch will be referred to as switch D.

Switch arms 53 and 54 (see Figures 7 and 7ᵇ) are operated by gear 11 through the mechanism shown in section in Figure 3. The lever 53 controls the timing and operation of the oil valve and this switch will be referred to hereinafter as "switch E". It is operated by the combined action of the twin cams 55 and 56.

The lever 54 controls auxiliary circuits for the "begin blow" sequence and this switch will be referred to hereinafter as "switch F". It is operated by the non-adjustable cam 32.

The angular position of the sleeve 57 carrying the cam 55 is adjusted by means of the setting arm 57ª; and the position of the cam 56 keyed on the shaft 58 is adjusted by means of the setting arm 59. These operations are entirely similar to those already described for setting arms 50ª and 52, for instance, and need no further description. The dial plate 60 which cooperates with these arms is attached to the sleeve 61 keyed to gear 11.

As shown in Figure 1, the setting arms 57ª and 59 are provided with stop extensions 62 and 63 which limit the relative positions of the setting arms. In this limit position, with these stops in contact, the valleys of the cams 55 and 56 are closed so as entirely to prevent operation of switch lever 53. The fixed stop pin 64 on the dial limits the positions of both arms. Similar stops are used on the other arms and dials. (See Figure 1.)

In order to prevent any possible incorrect sequence of operation I prefer to interlock switch levers 42, 43, 45 and 53. This is preferably accomplished as follows:

Referring to Figures 5, 7 and 7ª, it will be seen that the lever 26, depending from and operated by the pawl 4, as hitherto described, engages a horizontal longitudinally movable interlock bar 65, by means of a pin 66 working in the slot 67. In the normal step by step operation already described, the movements of the bar 26 due to movements of the pawl 4 merely produce back and forth movement of the pin 66 in the slot 67.

As has already been described, however, the return to zero involves an extreme lift of the pawl 4 to free the wheel 3, and in consequence the lever 26 is pushed to the extreme left in Figure 7ª. This pushes the bar 65 to the left.

Now, as indicated in Figure 7ª, switch lever 42 is pivotally attached to the bar 65 by the pin 68. The switch lever 45 carries a pin engaging in the slot 69 and the switch lever 53 also has a pin engaging in the slot 70.

Consequently, when, on return to zero, the lever 26 pushes the bar 65 to the extreme left in Fig. 7ª, these interlocked switch levers 42, 43, 45 and 53 are all thrown to the left.

This brings the corresponding switches A, B, C and E into proper position for beginning the cycle ("begin blow" sequence).

It will be seen further that the interlocking just described prevents the levers 45 and 53 from shifting from left to right (even though their cams might permit it) until after switch arms 42 and 43 have operated from left to right.

The mechanical interlock just described prevents the "begin blow" sequence from operating before the hot valve is changed from "down" to "up" and before the oil valve has closed; as will be made more clear in connection with the description of the electrical diagram. Also the hot valve is not allowed to operate from "up" to "down" and the oil valve cannot open until after the "begin run" sequence is started by movement of the switch arm 42 from left to right.

Ordinarily the operation by intermittent switch movements a quarter of a minute apart as above described is entirely satisfactory; but it is sometimes desirable to operate a gas making unit for a short time with a shorter or longer "blow" than permitted by fifteen second intervals of motion. For instance it may become desirable to have a "blow" of, say two minutes and five seconds. This may be accomplished by splitting the quarter minute interval at the change from "blow" to "run", taking five seconds from the run and adding it to the "blow".

The apparatus for accomplishing changes of this kind is shown in Figures 1, 6, 9 and 10.

Just above the master shaft 1 is located an auxiliary quarter minute shaft 71 driven by the shaft 1 through the one-to-one gears 71ª and 71ᵇ. The disk 76 is fast upon the shaft 71, and upon the outer face of this disc is a circular row of pockets for accommodating the spring-pressed ball or balls 77 carried by the disc 72. The disc 72 carries a cam extension 72ª, and it is keyed to a sleeve extending out to the front of the main frame where a graduated dial plate 78 with a knurled edge is keyed to it. A pointer 79 on the end of the shaft 71 turns in front of the movable dial 78.

By turning the dial 78 by hand, the friction ball 77 can be shifted from one pocket to another in the disc 76, thus permitting angular adjustment between the pointer 79 and dial 78 whereby the position of the cam extension 72ª can be read from the front. The pockets in the disc 76 are one half second apart, so that a minimum change in position of the cam extension 72ª of a half second is made possible.

As shown in Figures 9 and 10, the roller 73, on the end of the lever 74 fulcrumed at 80, bears on the disc 72, and when the cam extension 72ª passes over 73, the vertical suspended bar 75 is lifted clear of the extension 65ª on the interlock bar 65, permitting movement of this bar to the right for starting the "run" (see also Figures 7 and 7ª).

Ordinarily the cam extension 72ª is so placed that the rod 75 is lifted in time to permit movement of the interlock bar to the right when the "begin run" cam 40 permits the switch arm 42 to move, carrying the bar with it. When the cam extension 72ª is moved through a desired angle by turning the dial plate 78, the lifting of the rod 75 is correspondingly delayed, and, even though the "begin run" operation of the cam 40 has taken place, the actual operation of the switch lever 42 is prevented because the bar 65 is locked at 65ª. The parts just described constitute an automatic adjustable lock for the principal switch members.

When the bar has shifted to the right, the rod 75 rests on the bar 65 and the roller 73 is thus held clear of the cam extension 72ª. During the "blow", the bar 75 rises and falls in front of the extension 65ᵃ every quarter minute. The continuous rotation of the dial plate 78 furnishes a constant indication that the apparatus is functioning.

In a water gas set, the fuel must, of course, be renewed from time to time, and it is desirable to furnish means whereby the set will be automatically shut down in "safe" position after a predetermined number of cycles have been accomplished. My apparatus is provided with means of this kind which can be adjusted beforehand to determine in advance the number of cycles to be accomplished before the shut down occurs. This portion of the apparatus may be called the "charging schedule".

The charging schedule switch is shown in detail in Figures 2, 11 and 11ᵃ.

Mounted upon the gear 7 (Fig. 2) is the driving pawl 81 which makes one revolution per cycle, and at each revolution engages a tooth of the ratchet wheel 82 moving it one tooth counter-clockwise at the end of each cycle. The wheel 82 is attached to the shaft 83, to which is also attached the knob 84 and pointer 85.

The switch arm 86 is loosely pivoted upon the shaft 83 and behind the pointer 85 is the fixed dial 87 with graduations from "0" to "12" and preferably marked "Runs to be made".

Suppose that the pointer 85 is set at "9" as shown in Figure 1, then after eight cycles are completed, the pointer will reach "0" and at the beginning of the ninth cycle the pin 88 carried by the wheel 82 will push the switch arm 86 so as to break circuit on the right and close it on the left of the switch in Figure 11.

This will be accomplished against the pull of the spring 89 attached to one arm of the bell-crank lever 90 pivoted at 91. The other arm of the lever 90 acts as a retaining pawl for the wheel 82 in its anti-clockwise movement.

As soon as this right to left movement of the switch arm 86 has taken place, further anti-clockwise movement of the wheel 82 is prevented because, as shown at 82ᵃ, a tooth is omitted at this point. The operation of the automatic shut down will be explained in connection with the electrical diagram.

After the gas set has been recharged with fuel, the pointer 85 is reset by hand to any desired position to determine the next number of cycles to be accomplished before again recharging.

In order to accomplish this the holding pawl is released by slighty turning clockwise the knob 93 attached to the shaft 94. The lever 95 on this shaft lifts the link 96 connected with the holding pawl 90; when the knob 84 can be turned with the other hand to bring the pointer 85 into the desired position.

It will be seen that the set may be shut down at any time, if desired, by merely turning the knob 84 counter-clockwise until the pointer 85 indicates zero. As soon as the cycle then in progress is completed the pin 88 will throw the switch arm 86 and shut down the set.

One of the important features of this invention is the automatic shut-down switch, the electrical details of which are made clear in connection with the electrical diagram hereinafter. This is a compound switch which is automatically thrown in order to cause the system to be shut down in safe condition. It should operate on the occurrence of any one of the following contingencies.

First: When the "charging schedule" just described is operated. This is a routine operation whenever the fuel is to be recharged.

Second: When any valve fails to operate at the proper time.

Third: When it is desired to shut down immediately for any reason; in which case this switch is operated by hand or otherwise independently of the regular automatic control.

Fourth: In case of failure of the electric power the switch is tripped, so that, when power comes on again the set goes automatically to safe shut down condition.

Fifth: In case of various accidents, such as accidental ground or short circuit in the wiring, breakage of the cord holding the weight 27, failure of hydraulic pressure etc.

The principal mechanical features of this switch are shown in Figures 12 and 12ᵃ. The supporting and operating shaft of this switch is shown at 97. It is revolubly mounted in the end plates of the frame 98.

Cross members 100 and 100ᵃ are keyed on the two ends of this shaft 97, and they carry two parallel bars 99 and 99ᵃ. Upon these bars are carried insulated copper contact sleeves 101 and disc separators 102 made of insulating material between adjacent pairs of copper contact sleeves.

In the position of the switch shown the contact sleeves 101 carried on the arm 99 are in contact with two opposed rows of stationary switch contacts 103; while the sleeves on the arm 99ᵃ are in similar contact with opposed rows of fixed contacts 103ᵃ. This is the normal or running position.

When the switch is thrown in a manner hereafter described, the shaft 97 rotates far enough counter-clockwise in Figure 12ᵃ to bring the sleeves on the arm 99 against the rows of switch contacts 104; while the sleeves on the arm 99ᵃ make contact with the fixed switch members 104ᵃ. This is the shut down position of the switch.

Referring now to Figure 13; in the normal running position the proper running position of the shut down switch is secured by means of the latch arm 105 secured to the right hand end of the shaft 97 (as looked at in Figure 12). The arm 105 carries a square extension 106 which is normally held by a notch or shoulder 107 on the trigger lever 108 pivoted at 109.

A solenoid 110 is carried on the right end of the frame 98 and its movable core or plunger 111 is normally suspended in the position shown by the magnetic effort of the energized solenoid 110. This plunger hangs directly over the tail 108ª of the trigger 108.

If at any time the solenoid becomes de-energized, the plunger 111 will fall upon the tail 108ª and release the notch 107 from the latch extension 106 on the arm 105. When this occurs, the bar 112, pivoted to the arm 105 at 113 draws the arm 105 into the dotted line position shown in Figure 12. This is accomplished by the spring 114 shown in Figure 6. This throws the switch into the shut down position above described.

When the shut down switch is to be tripped by hand for emergency purposes the following operations take place.

The knob 115 shown in Fig. 1 is keyed to the shaft 116, on one end of which is pinned the arm 117 (Fig. 13). On turning the knob 115 slightly to the left in Figure 1 the outer end of the arm 117 lifts the pin 118 and with it the bar 119 to which said pin is fixed. The bar 119 slides in guides 120 and 120ª and carries a shoulder 121 which lifts the pin 122 on the trigger 108. This, of course, trips the trigger and causes the shut down switch to be thrown as before.

If the cord 28 carrying the weight 27 should break accidentally the gear train would not return to zero. The wheel 3 would therefore be driven forward by the pawl 2 beyond the return to zero point, and in that case the arm 125 fixed to shaft 14 (see Figures 5 and 13) would lift the pin 123 on the bar 119, releasing the trigger 108 as before.

Whenever the shut down switch is moved to shut down position the gear train must be stopped so that there may be no further operation of the switch cams and levers. This is carried out as follows—

As already pointed out, the movement of the arm 105 which throws the shut down switch is produced by an upward movement of the bar 112; which, in turn, is caused by the spring 114, one end of which is fixed to the pin 115 and the other to the fixed bearing support 116 (see Figure 6).

The upper end of the bar 112 is pivotally fastened at 117 to one arm of a bell crank lever 118 pivoted at 119 to the fixed support 120. At the end of the other arm of the bell crank lever is a pin 121 which enters an annular groove in the clutch spool 122. This spool 122 is slidably keyed on the shaft 1 and carries the driving pawl 2.

From this construction it is clear that, when the bar 112 rises the bell crank lever 118 will shift the spool 122 and carry the pawl 2 out of engagement with the wheel 3. This will of course stop the entire gear train, cams etc.; except that the auxiliary quarter minute shaft 71 and parts connected therewith will continue to run.

After the automatic switch has been thrown it can be reset manually by means of the handle 124 on the front end of the switch shaft 97. For this purpose the shaft should, of course, be turned far enough to latch the arm 105 against the extension 106.

The independent "fifteen second switch" shown at V on the diagram comprises a drum 126 (see Figures 2 and 6) mounted upon the master shaft 1 so as to rotate once in fifteen seconds. With this drum there cooperates a row of three stationary spring contacts 127. Two circuit controllers are thus produced as indicated at V in the diagram. One of these is arranged to open the circuit for an adjustable number of seconds at the beginning of each fifteen second interval; and the other is arranged to open a circuit for the last second of each fifteen minute interval. This last named opening of circuit will cause operation of the automatic shut down switch, unless prevented by the proper orderly operation of the entire system.

In my United States Patent Number 1,498,174, dated June 17th, 1924, I have described and claimed an automatically controlled water gas set, operated electrically from a central circuit controller, wherein the various hydraulically operated main valves are interlocked for safe and proper sequence in operation, by means of switches operated immediately by the moving parts of the respective main valves.

The present invention relates principally to a distinct and valuable improvement upon the general system shown in my patent aforesaid, and the present invention embodies some of the principles of the patented improvement, embodied in a different form.

One of the principal improvements to be found in the present invention as over the earlier form above mentioned is found in the fact that my present improvement is operated upon a closed circuit system. That is to say, during normal operation of the gas making apparatus (in the case described a water gas set) an electric circuit is kept constantly closed, and the construction is such that, in case of failure of current in the circuit in question, caused by improper operation of any unit in the system, the system is automatically shut down in safe condition; or if by failure of current supply from outside or by loose connections, broken wires or grounding, the system is at once prepared for a safe shut down when current is restored. The increased safety thereby secured, as over the former open-circuit system is obvious.

In my former application for United States patent Serial Number 619,258, filed February 15th, 1923, I have described and claimed electrically controlled apparatus whereby the pilot valves controlling the various main hydraulic valves of a water gas set are automatically operated by a continuously rotating shaft which is brought into operative relation with the pilot valve levers at proper times by clutches actuated by solenoids. These solenoids are associated with interlocking switches, additional to those immediately operated by the main hydraulic valve members as aforesaid.

In explaining the operation of my present improvement with reference to the accompanying electrical diagram it is to be understood that the switches shown are divided into three main divisions. Those at the top of the assembled diagram include the various switches hereinbefore described. Those at the bottom of the assembled diagram are the interlocking switches preferably immediately operated by the main valve members of the gas set.

The intermediate portion of the diagram indicates the solenoids actuating the clutches of the pilot valve operators, as in my said prior patent application, together with the additional interlocking switches associated with said solenoids and valve operators.

For greater convenience in following my description and in referring to the drawing I have adopted a system of reference notation in which contacts in different switches which are in direct electric communication, and therefore preserve substantially the same potential, are indicated by the same numeral. This makes it evident at a glance which are the interconnected parts, and saves time and effort.

As already stated, the switches already identified in the central control by capital letters, are similarly identified upon the electric circuit diagram.

In describing the changes in the electric circuits incident to the operation of a water gas set by the use of my present invention, it will be convenient to assume the apparatus as starting from the "zero" position; that is to say at the "begin blow" condition which marks the commencement of a cycle of operation.

In the zero position the carburetor blast valve—the greater blast valve—the stack valve (purge)—the turbine and the oil valve are all closed. The generator steam valve is open and the hot valve is in the "up" position.

The solenoid operating current comes from the "line" terminals, L' and L². In the normal position of the automatic shut down switch, shown at G, the incoming line terminal L' is connected with contact 201, which thereby allows current to reach contact 201 in switch A, operated by cam 40.

As already described, the "return to zero" operation of the central controller caused the lever 65 to shift switches A, B, C and E to assume the position shown in the diagram. This is the "blow" position.

In this position, current from contact 201, flows directly to contacts 202 in switches A and G, thence to contacts 203 in G and E—to contacts 204 in switch E and interlock switch H on oil pilot valve operator—contacts 205 in switch H and switch H' (interlock on main oil valve)—to contacts 206 in switches H' and E—contacts 207 in switches E and G—to contacts 208 in switches G and C (operated by switch lever 45)—to contacts 209 in switches C and J' (main hot valve interlock)—to contacts 210 in said switch J' and in switch J² (steam reverse valve)—to contacts 211 in switches J² and C—to contacts 212 in switches C and G—to contacts 213 in switches G and A.

The circuit as thus far traced may be looked upon as a checking up circuit; and if the various interlocking switches are found in the proper positions shown, corresponding to the valve condition above described for "zero" position, the operating circuit may be traced from the switch A onward as follows—

From 213 in A current reaches 214 in switches A and K (turbine pilot switch interlock) thence through 247 and the clutch solenoid at K to wire 251 which is connected to the line terminal L². This completes the circuit and energizes the turbine valve solenoid at K.

The air blast turbine being thus started, when the air pressure reaches the proper amount main interlock switch K' is shifted so that current passes from 214 to contact 215 in K'. When this is accomplished the current is divided.

One branch passes from 215 at K' to 215 at M, passing through interlock contact 245 to the generator blast valve solenoid and out at 251. This opens the generator blast valve.

The second branch passes to contact 215 in switch G—to contacts 222 in switch G and switch N (generator steam pilot interlock) and thence through contact 249 and generator steam valve solenoid at N to wire 251. This closes the generator steam valve.

The stack valve or purge valve is controlled through the optional hand switch 275. When this switch is closed there is no delay, but when open, as shown, a third branch current may be traced from 215 in switch 275, through the delay apparatus hereinafter described, to contacts 223 in switches 275 and G—to contacts 224 in switches G and P (stack pilot interlock)— by contact 246 and stack solenoid to wire 251 and "line". This opens the stack valve or purge.

When the generator steam valve has thus been closed and the generator blast valve and stack valve have been opened, their interlock switches are set for operation of the carbureter valve. This should not be opened, however, until after the first fifteen second interval following zero; and to insure this, the switch F, remains in the position shown in the diagram until fifteen seconds have elapsed, when the movable contacts are thrown to the right in the diagram and the opening of the carbureter valve is accomplished as follows:

The current above traced to contacts 215 now passes to 216 in switch N' (main generator steam interlock)—to 216 at M' (main generator blast interlock)—to 217 and 218 at P' (main stack valve interlock) and to 218 and 219 at F newly closed after fifteen seconds.

With the hand switch 278 closed on the contact 220, current passes to 220 at R (carburetter pilot interlock) and thence by 244, through carburetter valve solenoid to wire 251.

As soon as the carburetter is opened, current is free to flow from 220 at R' (main carburetter valve interlock) to 221 in switch A and thence by 228, to the solenoid at G which has already been described in connection with operation of the automatic shut down switch and thence to line L².

When it is desired not to open the carburetter valve, the switch 278 is closed on 221, and current passes at once to the solenoid at G.

Since the normal or running position of the switch G can only be maintained so long as the solenoid at G is energized, it is clear that the electric operation above described could only be carried out by providing means for energizing this solenoid before current is admitted to it through 220 and 221.

During the first fifteen second interval of the cycle, circuit is maintained through the solenoid at G by independent current passing from 201 in switch F to 252, and thence to 228 in the charging schedule switch at S and from 228 to the solenoid at G.

At the end of this first quarter minute, however, the switch F is thrown to the right closing circuit from 201 to 253, so that current goes to the three armed switch at T, passing from 253 to 225 (when the switch is closed in the lower position). Current is continually maintained on 225 throughout the remainder of the cycle, and passes to 225 at V. Here circuit is closed between 225 and 228 (and therefore the solenoid at G) throughout all but the last second of each succeeding fifteen second interval. Hence it is clear that, if for any reason there is a failure of circuit through the solenoid at G and through the operating interlocks as heretofore described, the opening of circuit at the end of the current fifteen second interval at 225, 228 in switch V will de-energize the solenoid and throw the switch G as before described.

Referring to the three pole double throw switch T above mentioned, this switch is employed to adapt the system to either shutting down after a "blow" or after a "run" at the will of the operator. Circuit is closed on the upper contacts 252, 255, 256, when it is intended to shut down after a "blow". When the shut down is to occur after a "run", the switch T is closed on the lower contacts.

The circuits so far described establish the condition of main valves for the "blow," and this continues until the "run" is to be begun by operation of cams 40 and 41, which is prearranged by setting these cams as heretofore described.

At the beginning of the "run" portion of a total cycle the switches A and B are thrown to the left by the cams 40 and 41.

Current from L' passes to 201 in the shut down switch G and thence to 226 in switch A and to 226 and 244 in switch R, going through the solenoid at R to 251, and closing the carburetter blast valve. As soon as this solenoid operates the interlock switch at R connects 226 and 227 and current passes through 227 and 229 at R' (carburetter blast main valve interlock) when carburetter blast valve is closed. Thence current passes to 229 and 235 in the switch G and by 235—246 at P, it energizes the solenoid which closes the stack valve.

Either simultaneously or after an adjustable delay (depending on whether the delay switch 276 is closed or open) current passes through 229 and 237 of the delay switch, thence to 237 and 238 in the switch G, thence to 238 and 245 at M, energizing the solenoid that closes the generator blast.

The generator steam solenoid at N is energized to close this valve either simultaneously with the stack valve solenoid or after an adjustable delay, depending on the position of the switch 277. For this purpose current passes from 235 to 236 in the switch 277 and thence to 236 and 249 at N, and through the solenoid to 251. This opens the generator steam valve.

When the generator blast valve has been closed, current passes from 229, through 229 and 230 of the pilot valve generator blast interlock at M, through 230 and 231 of the main interlock at M', to energize the solenoid at K through contacts 231 and 247, causing the turbine valve to close.

At this stage the switches C and E respectively may be in either position, according to the particular setting of the cams 47 and 48, governing switch C and 55 and 56, in governing switch E. If the switch C is in the left hand position in the diagram the hot valve is set for a "down run"; and, if this switch is in the right hand position the hot valve is set for the "up run."

If the switch E is in the right hand position, the oil valve will not be opened at once, but current will now flow as follows: The stack valve having been closed, the generator steam valve opened, and the turbine shut down, the interlock switches permit current to proceed from contacts 230 and 231 at M′ to 231 and 232 at P′, thence through 232 and 233 at N′ and 233 and 234 at K′ to 234 and 202 in switch A (actuated by cam 40). Thence current passes to 202 and 203 in shut down switch G and then to 203 and 204 in oil switch E, to 204 and 205 at switch H, to 205 and 206 at switch H′, to 206 and 207 at E, to 207 and 208 at shut down switch G, and then either to 208 and 209 or to 208 and 241 at switch C, depending on the position of the cams 47 and 48.

Assuming that a "down run" is desired, and that the switch C has been shifted to the left in the diagram, current will go by 208 and 241 at C, and through 241 and 248 to the hot valve solenoid at J to 251. This will cause shifting of the hot valve together with the steam reverse valve mechanically connected therewith as usual in this art.

As soon as this "down run" position occurs, current flows through 241 and 242 at J′ and 242 and 243 at J², back to 243 and 212 at C, through 212 and 213 at G, to 213 and 228 at A and through the shut down switch solenoid at G to L². Thereafter this solenoid is kept energized to prevent the automatic shut down by current through the various switches and interlocks described.

Preparatory to the establishment of this condition, however, it is necessary to keep the solenoid at G energized to prevent shutting down, and for this purpose the switch B closes circuit at 201 and 254 only during the first fifteen second period of that portion of the cycle establishing the "run," which is termed the "make."

Accordingly current then passes by 201 and 254 at B, through 254 and 228 at T, when intended to shut down at the end of "run," and from 228 through the solenoid at G to L². If intended to shut down at the end of "blow" the current goes from 254 at B to 254 and 252 at T, and thence through 252 and 228 at S (charging schedule) to the solenoid at G.

After the first fifteen second period of the "make," the switch B breaks contact at 201 and 254 and makes it at 201 and 255, which are only used when it is intended to shut down after a "blow." In this case current proceeds from 255 at B to 255 and 225 at T, to 225 on the "fifteen second switch" at V. The relation of this switch to the solenoid at G has already been described.

When the cams 55 and 56 throw the switch E to the left in the diagram to put the oil on, current will flow through 203 and 239 at E, through 239 and 250 at H and through the oil valve solenoid at H to 251, thus opening the oil valve. As soon as the oil valve is opened, current flows through 239—240 at the main oil interlock at H′, and thence to 207 at E. From this point current may be traced as described above.

Supposing, now, that this oil valve had failed to completely open during the first fourteen seconds of the fifteen second period in which the cams 55 and 56 acted, the solenoid at G would have been de-energized to operate the shut down switch, by interruption of the independent energizing circuit at the fifteen second switch V. This is because the regular valve interlock circuit would not have been closed at 239—240.

When the solenoid at G is thus de-energized and the shut down switch at G is thrown, normal circuits are broken, and new circuits are established for shutting down to safety. The positions of the active bridging plates of switch G in shut down position are shown in dotted lines in the diagram.

As thus shown, L′ is connected to 258 at G, and current passes thence through 258—259 in switch D, to 259 and out through the coils of an alarm bell to L², thus sounding an alarm.

Current also passes to 226 at G acting to close the carburetter blast, generator blast and turbine valves, when required. L′ is also connected to 204 to close the oil valve through 204—250 at H.

As soon as the solenoid at H has acted to close the oil valve, current passes through 204—205 at H, to 205—206 at H′, to 206—224 at G, to 224—246 and through the solenoid at P to open the purge valve. Also from 206—209 at G, to 209—248 and the solenoid at J to throw the hot valve and steam reverse to the "up run" position. When this last is accomplished, current passes from 209—210 and 210—211 at J′ and J² to 211—222 at G, thence to 222—249 and through the solenoid at N to close the generator steam valve.

Alternate "blows" and "runs" follow each other in succession as thus described until such time as recoaling or recharging the generator with fuel is necessary when the gas set is automatically shut down. This is accomplished in the following manner.

The charging schedule switch previously described is set so that it will automatically operate after a predetermined number of runs. For example, the operation of the gas set may require that the generator should be charged with fuel after say every 8 cycles.

In that case the pointer 85 of the charging schedule switch is set opposite the graduation "8" on the dial 87 indicating that there are eight "runs to be made" before charging. After seven cycles have been made and early in the eighth cycle the switch arm 86 will be operated as previously described with reference to Fig. 11, breaking the circuits 256—225 and 228—252 at the lower part of S in Fig. 14 and closing the circuit L² and 260 in the upper part of this switch. This operation of the switch S does not take place until after the first half minute of the cycle has elapsed.

During the first quarter minute of the "blow" period of the eighth cycle, therefore, the circuit through the solenoid of the automatic switch G is sustained, as in the previous cycles, at the contacts 201 and 252 at switch F as previously explained, and the eighth cycle is completed in the regular manner. Upon completion of this cycle, another cycle is attempted but is only permitted to proceed sufficiently far to open the generator blast valve to accomplish the purging of the generator, after which the set is shut down automatically so that fuel can be charged. This is accomplished by interrupting the sustaining circuit at the right time so that the automatic switch G can be operated. The sustaining circuit through 201 and 252 in switch F and 252 and 228 in switch S being now open in the latter switch, it is evident that the solenoid of the automatic switch must be sustained long enough to permit the turbine blower and the generator blast to be opened. This sustaining is provided at contacts 257 and 225 in switch V which are adjustable and set to open after a predetermined number of seconds of the first quarter minute of the cycle have elapsed, or long enough to permit the turbine blower to open, the generator steam to close and the generator blast valve to open and the latter to remain open sufficiently long to purge the generator of any combustible gas so that the fuel charging door may be opened with safety. This circuit is established by current flowing from 201 to 257 in switch T in its lower position and 257, 225 and 228 in switch V. At the moment when 257 and 225 open, the solenoid of the automatic switch G drops its plunger, the switch is thrown, the normal circuits through this switch are interrupted and new shut down circuits established, all as explained previously in the example when the oil valve was supposed to have failed to operate properly. Current therefore passes from L¹ to 226 at G, 226 and 227 at R, 227 and 229 at R¹, 229 and 238 at G and 238 and 245 at M, closing the generator blast. The stack is opened by current from L¹ to 204 in G, 204 and 205 in H, 205 and 206 in H¹, 206 and 224 in G and 224 and 246 in P.

It may be noted here that when the charging schedule switch S, operated after the 8th cycle, had started, the contacts L₂ and 260 in the upper part of this switch were closed for the purpose of lighting a signal light to call the operator's attention and warn him that the generator is due to be charged with fuel.

When the fuel is charged and the charging door closed, the charging schedule switch S is reset thus closing the circuits 256—225 and 252—228. The automatic switch is reset and as the normal sustaining circuit 201—252 in switch F and 252—228 in switch S is again complete, the next cycle is started and continued in the manner previously explained.

The above described automatic shut down for charging fuel took place at the end of the run which is the usual time for charging fuel. When bituminous fuel is used however it is the practice to charge with fuel at the end of the blow. This is accomplished by changing the 3 pole switch T to its upper position. Assuming as before that the pointer 85 of the charging schedule switch is set opposite the graduation "8" the switch arm 86 will, as before explained, be operated early in the eighth cycle, so that the contacts 256—225 and 252—228 in the switch S will be opened after the first half minute of the eighth cycle has elapsed. The "blow" period of this cycle will be carried through in the regular manner, as the solenoid of switch G has been sustained at the beginning of the blow at contacts 201 and 252 in the switch F.

At the end of the blow however the set will be shut down automatically for fueling in the following manner.

The switch lever 42 which is operated by the cam 40 at the end of blow or beginning of run breaks the circuits at the right of switch A and makes the circuits at the left of this switch. In the regular or nonshut down cycles the break in the circuit of the solenoid of automatic switch G which this operation causes is prevented from acting to de-energize the solenoid by the regular sustaining circuit which sustains the solenoid for the first fourteen seconds of every quarter minute period as follows; 201 to 256 in switch T, 256 and 225 in charging schedule switch S and 225 and 228 in switch V.

In the eighth or shut down cycle which we are describing this circuit is broken at 256—225 in switch S after the first half minute of the blow when the switch S operated. The fourteen second sustaining circuit is maintained from then to the end of the blow through contacts 201—255 at right of switch B (closed), 255 and 225 in switch T and 225 and 228 in switch V. At the end of the blow or beginning of the run there is a break in the regular circuit of the solenoid of switch G maintained through the contacts at right side of switch A when lever 42 is operated by cam 40 and moves from right to left. There is also a break in the fourteen second sustaining circuit at 201—255 in switch B when switch lever 43 is operated by cam 41 at same time as lever 42 is operated. This causes the set to shut down automatically and, as no purging is necessary, the blast valves are closed in the regular manner.

After fuel is charged, the charging door is closed, charging schedule switch S and automatic switch G are reset in the regular manner and the set resumes operation beginning the "run" or "make" period as the lever 42 is now in the make position.

During the first quarter minute of the "make" period when the various valves are being operated to change from blow to run, the solenoid of switch G is sustained at contact 201—254 at left of switch B which are operated by switch lever 43 and cam 41. The circuit is then from 201 to 254 in B, 254 to 252 in switch T and 252 to 228 in charging schedule switch S. On the shut down for charging fuel cycle just described this sustaining circuit is broken when the switch S is operated.

It is clear that many changes might be made both in the mechanical and electrical embodiment of my invention without departing from the scope of my claims; and it is to be understood that I do not limit myself to the details herein shown and described.

What I claim is—

1. A sequence valve control apparatus comprising main operating valves, motive means for the same, an electro-magnetic operator for each of said motive means, electric circuits for controlling said electro-magnetic operators, a safety switch included in said circuits, and automatic means for throwing said switch adapted to operate on failure of current in a part of said circuits.

2. Apparatus as in claim 1 including means adapted to throw the safety switch when released and electro-magnetic means adapted when energized to prevent release of said throwing means.

3. Apparatus as in claim 1 in combination with a central circuit controller for the operating circuits and means for moving said controller step by step.

4. Apparatus as in claim 1 in combination with means for throwing the safety switch by hand.

5. Apparatus as in claim 1 in combination with interlocking switches in the controlling circuits operated by the main operating valves.

6. Apparatus as in claim 1 in combination with interlocking switches in the controlling switches operated by the electro-magnetic valve operators.

7. Apparatus as in claim 1, in combination with a normally closed circuit independent of the operating circuits for preventing throwing of the safety switch, and an automatically operated switch adapted to open said independent circuit momentarily at regular time intervals.

8. In a sequence valve control apparatus, main operating valves, motive means for the same, an electro-magnetic operator for each of said motive means, electric circuits for controlling said electro-magnetic operators, central controlling switches for said circuits, cams for actuating said switches and a step by step motive means for moving said cams; in combination with a mechanical interlocking bar connected with the movable members of the central switches, adapted to prevent improper sequence of operation thereof.

9. In a sequence valve control apparatus, main operating valves, motive means for the same, an electro-magnetic operator for each of said motive means, electric circuits for controlling said electro magnetic operators, central controlling switches for said circuits, cams for actuating said switches and a step by step motive means for moving said cams; in combination with means for disconnecting the step by step motive means and automatic means for driving the cams forward uninterruptedly for a limited distance, adapted to operate when the step by step motive means are disconnected.

10. Apparatus as in claim 1 in combination with a central controller switch and interlocking switches adapted to start a plurality of main operating valves, and means rendered inoperative by complete operation of all of said main valves, for causing the shut-down switch to be thrown after a predetermined interval of time after said valves are started.

11. A sequence valve control apparatus, comprising electrical controlling circuits, a revoluble shaft, a revoluble sleeve surrounding the same, adjustable means for connecting the sleeve and shaft in different relative positions, means for revolving the sleeve, and switch-operating means mounted respectively on said shaft and said sleeve.

12. Apparatus as in claim 11 wherein there is mounted upon the sleeve a disc having a series of openings and wherein the shaft is furnished with an arm having a movable pin adapted to enter any one of said openings at will.

13. A sequence valve control apparatus, comprising electrical controlling circuits, switches in said circuits, a shaft, two revoluble sleeves mounted thereon one within the other, adjustable means for connecting said sleeve in different relative positions, means for revolving the outer sleeve, and switch operating means mounted respectively on the two sleeves.

14. Apparatus as in claim 13 wherein there is mounted upon the outer sleeve a disc having a series of openings and wherein the inner sleeve is furnished with an arm having a movable pin adapted to enter any one of said openings at will.

15. Apparatus as in claim 11 wherein the switch-operating means comprise mutually adjustable twin cams and a switch lever whose end bears upon both of said cams.

16. A sequence valve control apparatus, comprising electrical controlling circuits and a central timing and switch operating device comprising a plurality of switch levers and a longitudinally movable interlocking bar connected with said levers for insuring appropriate relative operation of the same.

17. Apparatus as in claim 16 in combination with automatic means for moving the switch levers and interlocking bar in one direction, a blocking device for preventing this movement, and means adjustable as to time of operation and driven by said automatic means, for removing the blocking device and permitting movement of the switch levers and interlocking bar.

In testimony whereof I have hereto set my hand on this 14th day of August, 1924.

JAS. S. KENNEDY.